(12) United States Patent
Sawicki et al.

(10) Patent No.: US 11,209,026 B2
(45) Date of Patent: Dec. 28, 2021

(54) SERVO VALVES

(71) Applicant: Hamilton Sundstrand Corporation, Charlotte, NC (US)

(72) Inventors: Piotr Sawicki, Bogdaniec (PL); Marcin Cis, Lutynia (PL)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 13 days.

(21) Appl. No.: 16/701,446

(22) Filed: Dec. 3, 2019

(65) Prior Publication Data

US 2020/0309164 A1    Oct. 1, 2020

(30) Foreign Application Priority Data

Mar. 29, 2019 (EP) .................................. 19461523

(51) Int. Cl.
| | |
|---|---|
| *F15B 15/14* | (2006.01) |
| *F15B 5/00* | (2006.01) |
| *F15B 13/043* | (2006.01) |
| *F16K 31/06* | (2006.01) |
| *F16K 1/42* | (2006.01) |
| *F16K 11/044* | (2006.01) |

(52) U.S. Cl.
CPC .......... *F15B 15/1461* (2013.01); *F15B 5/003* (2013.01); *F15B 13/0438* (2013.01); *F16K 1/427* (2013.01); *F16K 11/044* (2013.01); *F16K 31/0627* (2013.01); *F16K 31/0682* (2013.01); *F15B 2211/615* (2013.01)

(58) Field of Classification Search
CPC .............. F15B 13/043; F15B 2211/615; Y10T 137/2278; F16K 31/0627; F16K 31/0682; F16K 1/427; F16K 11/044

USPC ........................................................... 137/82
See application file for complete search history.

(56) References Cited

U.S. PATENT DOCUMENTS

| | | | | |
|---|---|---|---|---|
| 2,934,765 A | * | 4/1960 | Carson ................ | F15B 13/0438 137/625.61 |
| 3,029,830 A | * | 4/1962 | Klover ................ | F15B 13/0438 137/82 |
| 3,163,180 A | * | 12/1964 | Campbell ........... | F15B 13/0438 137/625.62 |

(Continued)

FOREIGN PATENT DOCUMENTS

| | | |
|---|---|---|
| DE | 419027 C | 3/1926 |
| DE | 3630200 A1 | 3/1988 |

(Continued)

OTHER PUBLICATIONS

The Extended European Search Report for Application No. 19461523. 3-1015; Report dated Sep. 13, 2019; Report Received Date: Sep. 16, 2019; 9 pages.

*Primary Examiner* — William M McCalister
(74) *Attorney, Agent, or Firm* — Cantor Colburn LLP

(57) ABSTRACT

A nozzle of or for a servo valve comprises a nozzle element having a fluid outlet at a first axial end and a tubular body extending from the first end to an opposed, second axial end. The nozzle further comprises a plug element mounted in and closing the second axial end of the tubular body, thereby defining an internal cavity within the tubular body. One or more openings are formed through the tubular body to fluidly communicate with the internal cavity. A filter may be mounted across the internal cavity at a position axially intermediate the openings and the fluid outlet.

17 Claims, 6 Drawing Sheets

(56) References Cited

U.S. PATENT DOCUMENTS

| | | | | |
|---|---|---|---|---|
| 3,712,339 A * | 1/1973 | Bartholomaus | ..... | F15B 13/0438 137/625.62 |
| 3,857,541 A * | 12/1974 | Clark | ..... | F15B 13/0438 251/30.05 |
| 4,252,651 A * | 2/1981 | Soderstrom | ..... | B01D 61/32 210/97 |
| 4,352,367 A * | 10/1982 | Pollman | ..... | F15C 3/14 137/316 |
| 4,538,633 A * | 9/1985 | Stevens | ..... | F15B 13/0438 137/625.62 |
| 4,700,747 A | 10/1987 | Wartelle | | |
| 4,715,397 A * | 12/1987 | Stearns | ..... | F02C 9/263 137/486 |
| 4,825,894 A * | 5/1989 | Cummins | ..... | H02N 2/043 137/82 |
| 5,024,247 A * | 6/1991 | Lembke | ..... | H01F 7/1615 137/82 |
| 5,465,757 A * | 11/1995 | Peters | ..... | F15B 13/0438 137/625.65 |
| 5,630,440 A * | 5/1997 | Knutson | ..... | F02M 59/466 137/554 |
| 6,079,435 A * | 6/2000 | Franz | ..... | G05D 16/2022 137/82 |
| 6,648,014 B1 * | 11/2003 | Takahashi | ..... | F15B 13/0438 137/545 |
| 6,755,205 B1 * | 6/2004 | Hoemke | ..... | F15B 13/0438 137/625.62 |
| 7,069,947 B2 * | 7/2006 | Maeda | ..... | F16K 27/041 137/545 |
| 7,631,663 B2 * | 12/2009 | Rauch | ..... | F15B 13/0438 137/625.62 |
| 9,574,676 B2 * | 2/2017 | Laboda | ..... | H01F 7/121 |
| 10,082,217 B2 * | 9/2018 | Tillich | ..... | F16K 31/0675 |
| 10,821,563 B2 * | 11/2020 | Koz owski | ..... | F16K 51/00 |
| 2004/0050428 A1 * | 3/2004 | Benjey | ..... | B60K 15/04 137/592 |
| 2014/0216245 A1 * | 8/2014 | Veilleux, Jr. | ..... | F15B 5/003 92/172 |
| 2015/0192218 A1 * | 7/2015 | Arend | ..... | H02K 26/00 137/625.4 |
| 2015/0276083 A1 * | 10/2015 | Druhan | ..... | H02K 7/14 251/129.11 |
| 2017/0232563 A1 * | 8/2017 | Sawicki | ..... | F15B 19/002 29/446 |

FOREIGN PATENT DOCUMENTS

| | | |
|---|---|---|
| EP | 3205913 A1 | 8/2017 |
| FR | 1160032 A | 7/1958 |

* cited by examiner

SERVO VALVES

FOREIGN PRIORITY

This application claims priority to European Patent Application No. 19461523.3 filed Mar. 29, 2019, the entire contents of which is incorporated herein by reference.

TECHNICAL FIELD

This disclosure relates to servo valves and in particular to a nozzle assembly in a servo valve. This disclosure also relates to a method of assembling the nozzle assembly.

BACKGROUND

Servo valves are well-known in the art and can be used to control how much fluid is ported to an actuator. Typically, a flapper is deflected by an armature connected to an electric motor away or towards nozzles, which inject the fluid. Deflection of the flapper can control the amount of fluid injected from the nozzles, and thus the amount of fluid communicated to the actuator. In this way, servo valves can allow precise control of actuator movement.

In current designs, the nozzles are interference fitted into a nozzle housing. The nozzles and the housing are typically made of different materials. The nozzles may encounter wide ranging temperature changes during operation and due to differences in thermal expansion between the materials, the interference fit of the nozzle into the housing has to be very tight to ensure that it remains in the correct position within the housing at all operating temperatures. This requires very high manufacturing tolerances, which makes the nozzles expensive to produce. In addition, the tight interference fit may also make it difficult to calibrate the nozzle, as it may make it difficult to move the nozzle axially within the housing. It may also result in over-stressing of the nozzle housing due to the high initial level of interference.

In addition, the movement of the nozzle during calibration is effected by means of a push rod which is threaded or otherwise temporarily engaged with the nozzle. This rod may disrupt fluid flow through the nozzle, so some compensation may have to be made for this in the calibration.

In some arrangements a filter is also placed in an inlet to the nozzle housing after calibration, which again may need to be accounted for in the calibration.

SUMMARY

In accordance with this disclosure there is provided a nozzle of or for a servo valve. The nozzle comprises a nozzle element having a fluid outlet at a first axial end and a tubular body extending from the first end to an opposed, second axial end of the nozzle element. The nozzle further comprises a plug element mounted in and closing the second axial end of the tubular body, thereby defining an internal cavity within the tubular body. One or more openings are formed through the tubular body to fluidly communicate with the internal cavity.

The plug element may be threadedly mounted within the second axial end of the nozzle element.

The plug element may comprise an attachment for receiving a push rod.

The attachment may comprise a bore, for example a threaded bore, formed in a surface of the plug element on the opposite side of the plug element from the internal cavity of the nozzle element.

The plug element may comprise an annular wall extending in a direction away from the nozzle element for sealing engagement with a bore of the servo valve.

The annular wall may define an internal cavity open at one end, the cavity tapering inwardly in a direction towards the nozzle element for receiving a pin.

The nozzle may further comprise a filter element mounted across the internal cavity of the nozzle element at a position axially intermediate the one or more openings and the fluid outlet.

The filter element may be removably mounted, for example threadedly mounted, in the nozzle element.

The disclosure also provides a nozzle assembly for a servo valve. The nozzle assembly comprises a nozzle housing having a bore. A nozzle in accordance with the disclosure is mounted in the bore of the nozzle housing. The nozzle housing comprises a first fluid port in fluid communication with the one or more openings in the nozzle element and a second fluid port in fluid communication with the fluid outlet of the nozzle element.

The bore of the nozzle housing may comprise an annular groove formed therein. The first fluid port of the nozzle housing may open into the groove and the one or more openings of the nozzle element may be axially aligned with the annular groove.

The tubular body of the nozzle element may be a sealing fit within the bore of the nozzle housing.

The plug element may be secured and sealed against the bore of the nozzle housing.

The nozzle or nozzle assembly may further comprise a pin received within the tapering cavity defined by the annular wall of the plug element for forcing the annular wall of the plug element into sealing and gripping engagement with the bore of the nozzle housing.

The disclosure also provides a servo valve incorporating a nozzle or nozzle assembly in accordance with the disclosure.

The present disclosure also provides a method of calibrating a nozzle assembly in accordance with the disclosure. The method comprises inserting a nozzle in accordance with the disclosure into the bore of the nozzle housing, attaching a calibration tool, for example a push rod, to the plug element and moving the nozzle in a direction along its axis to a desired position by application of an axial force to the calibration tool. The nozzle is then secured in the bore of the nozzle housing and the calibration tool detached from the plug element. The step of attaching the calibration tool may occur before or after the step of inserting the nozzle in the bore.

Securing the nozzle may be effected before the calibration tool is detached from the plug element, whereby the calibration tool may be used to preventing axial movement of the nozzle during the securing.

The disclosure also provides, independently, a servo valve nozzle comprising a nozzle element defining an internal cavity having a fluid inlet and a fluid outlet, and a filter disposed across the internal cavity between the fluid inlet and the fluid outlet.

BRIEF DESCRIPTION OF DRAWINGS

An embodiment of the disclosure will now be described by way of example only with reference to the accompanying drawings in which.

DETAILED DESCRIPTION

Figure 1:
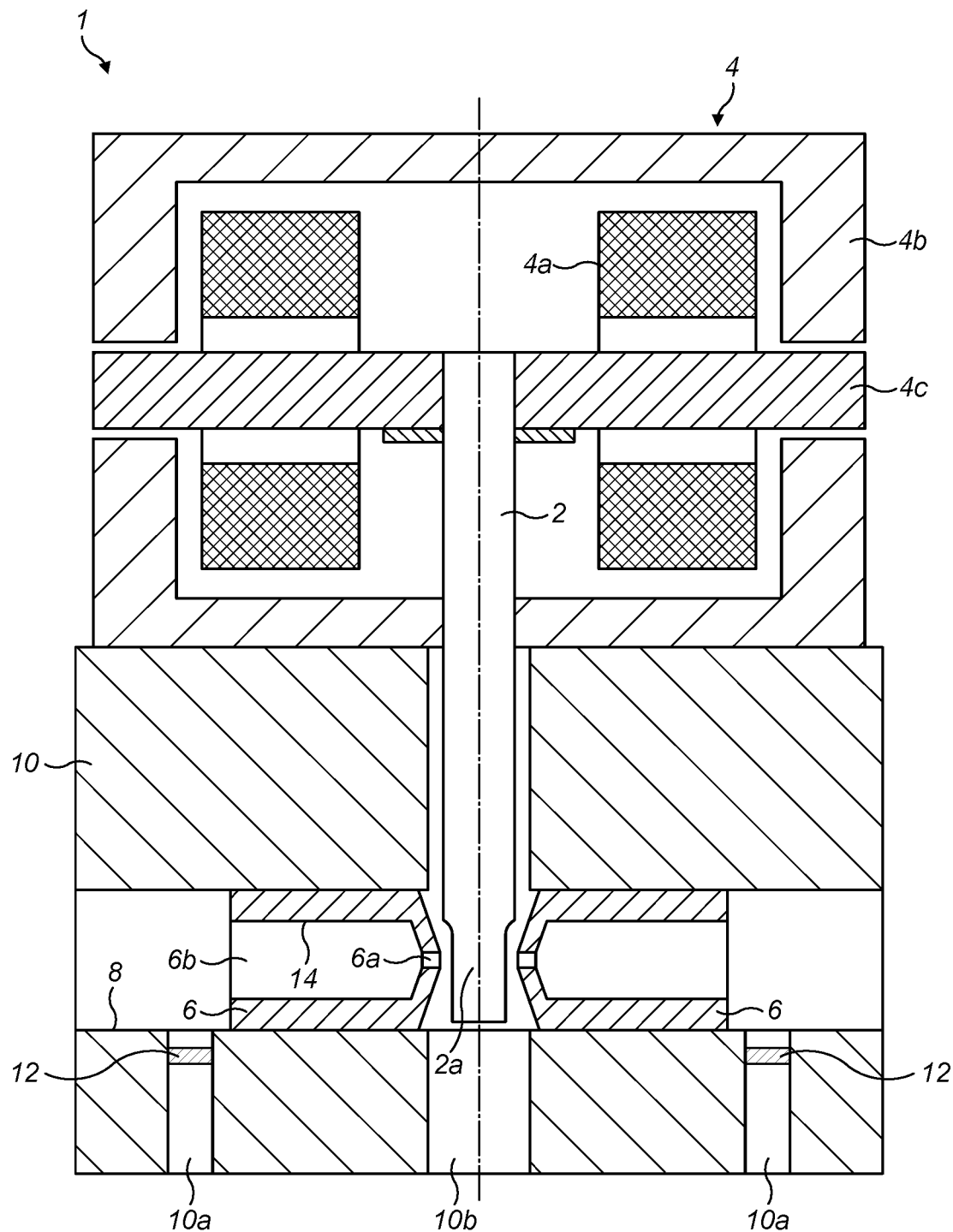
FIG. 1 shows an example of a prior art servo valve.

With reference to FIG. 1, a prior art servo valve 1 is illustrated. Servo valve 1 comprises an electric motor 4, flapper 2, nozzles 6 and nozzle housing 8. The electric motor 4 comprises coils 4a, permanent magnets 4b and armature 4c. The coils 4a are in electrical communication with an electrical supply (not shown) and when activated, interact with the permanent magnets 4b to create movement of armature 4c, as is well-known in the art. Flapper 2 is attached to armature 4c, and is deflected by movement of the armature 4c. Nozzles 6 are housed within respective bores 8 of nozzle housing 10 via an interference fit and comprise a fluid outlet 6a and fluid inlet 6b. Housing 10 also has ports 10a, which allows communication of fluid to the nozzles 6. The flapper 2 comprises a blocking element 2a at an end thereof which interacts with fluid outlets 6a of nozzles 6 to provide metering of fluid from the fluid outlets 6a to a fluid port 10b in the housing 10, which allows communication of metered fluid from the nozzles 6 to an actuator (not shown). Filters 12 are arranged in the ports 10a to prevent contaminants from entering and blocking the nozzle fluid outlet 6a. As is known in the art, the electric motor 4 is used to control deflection of the blocking element 2a and vary the fluid delivered to the actuator from nozzles 6 as required.

Prior to use, each nozzles 6 of the servo valve 1 must be calibrated. This is effected by moving the nozzle 6 towards and away from the blocking element 2a by means of a push rod which is normally threaded into the open end 14 of the nozzle 6. The push rod can then be manipulated to move the nozzle to its desired axial position. After calibration, the open ends of the housing bore 8 can are sealed.

As discussed above, the interference fit of the nozzle 6 in the housing bore 8 has to be very tight to ensure that it remains in the correct position within the housing bore 8 at all operating temperatures. This requires very high manufacturing tolerances, which makes the nozzle 6 expensive to produce. In addition, the tight interference fit may also make it difficult to calibrate the nozzle 6, as it may make it difficult to move the nozzle 6 axially within the housing bore 8.

An embodiment of servo valve in accordance with the disclosure will now be described with reference to FIGS. 2 to 6.

Figure 2:
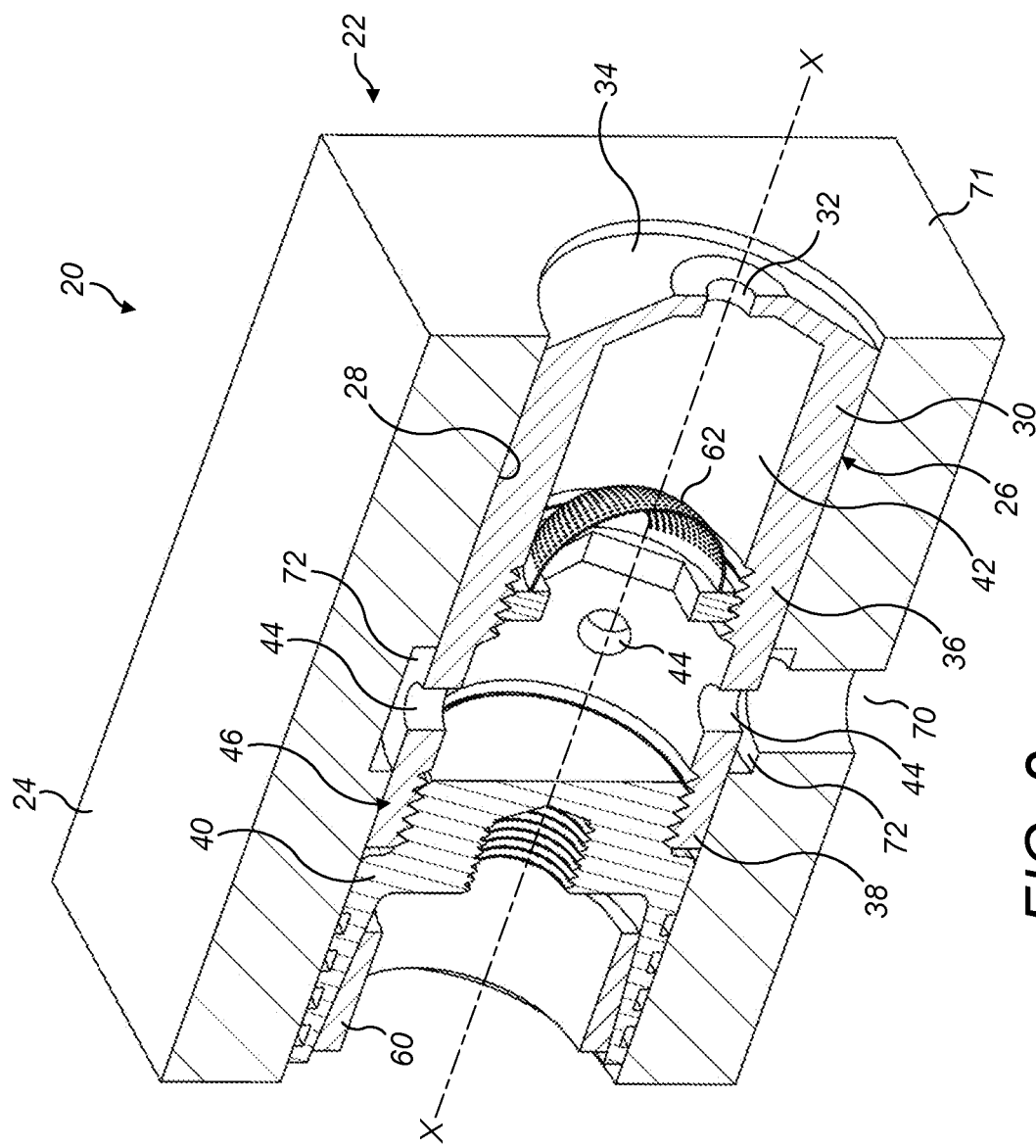
FIG. 2 shows a perspective cross-sectional view of an embodiment of a nozzle assembly in accordance with this disclosure.
Figure 3:
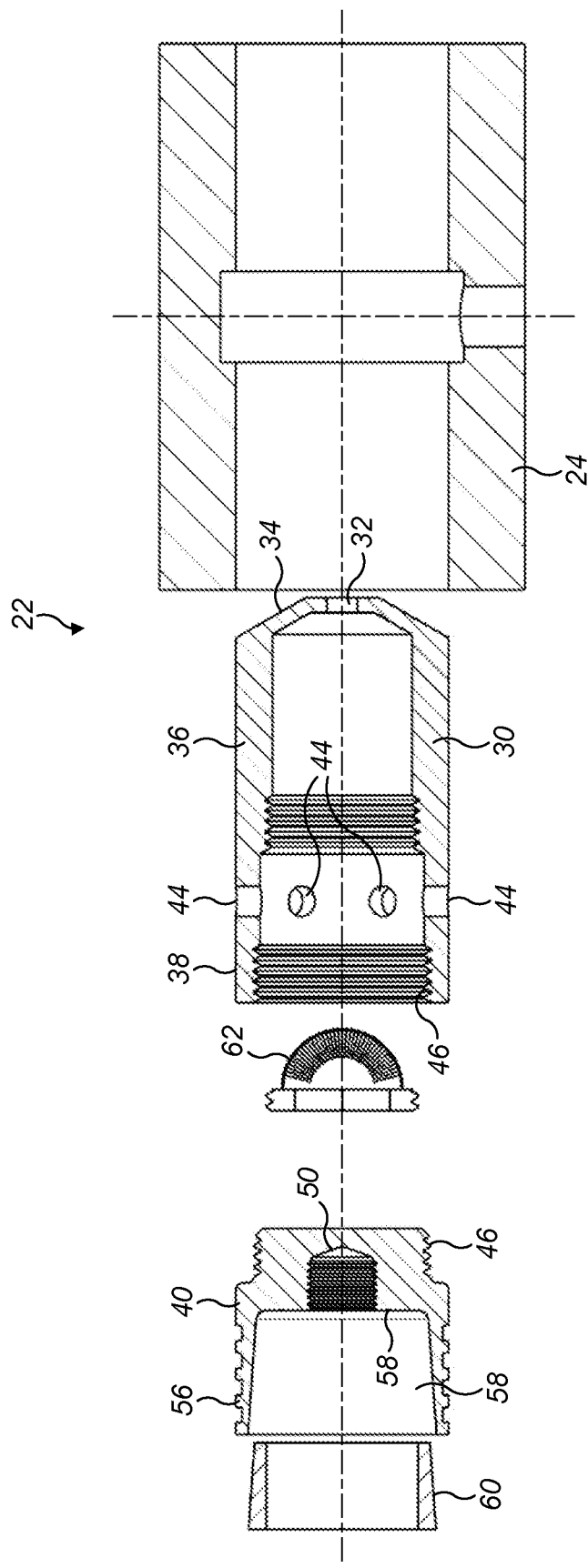
FIG. 3 shows an exploded view of the nozzle assembly of FIG. 2.

FIG. 2 shows a section through nozzle assembly of the servo valve, with FIG. 3 showing an exploded view of the nozzle assembly. Details of the flapper, armature and so on have been omitted for clarity, but it will be understood that the general configuration of the servo valve is similar to that described above. It is the construction of the nozzle which is different.

Figure 6:
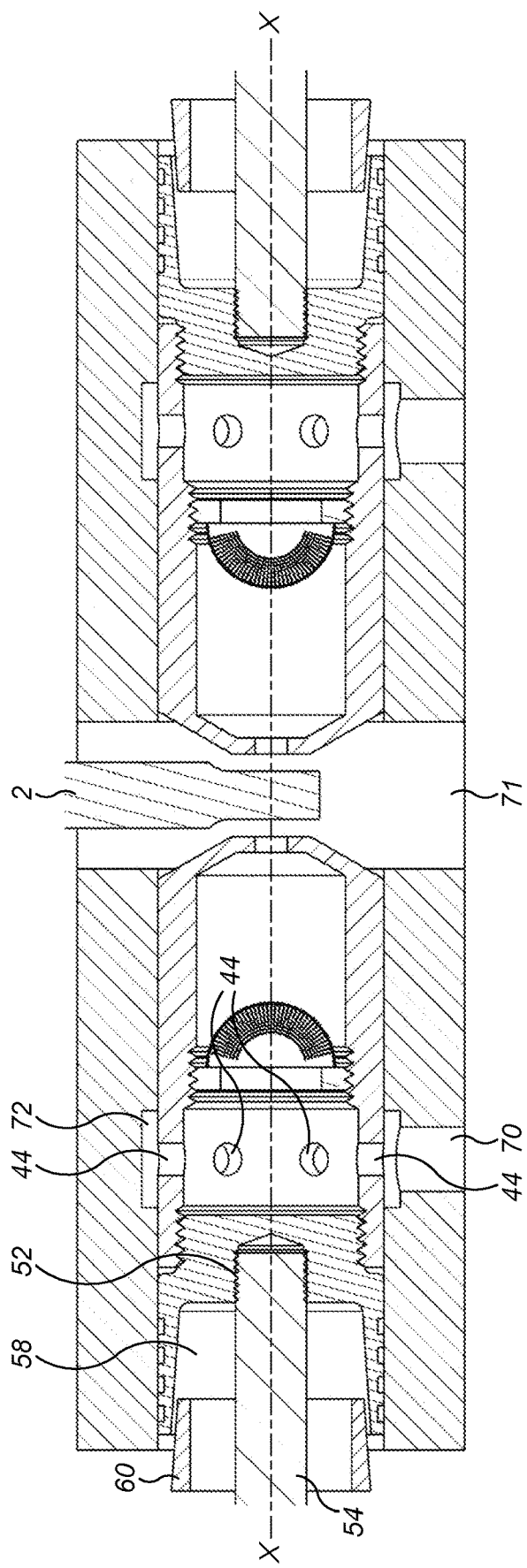
FIG. 6 illustrates the final steps in assembly and calibration of the nozzle assembly.

The servo valve 20 comprises a nozzle assembly 22. In practice, the servo valve will have opposed nozzle assemblies 22, as shown in FIG. 6, but only one nozzle assembly 22 is illustrated for reasons of clarity.

In broad terms, the nozzle assembly 22 comprises a nozzle housing 24 which may be a part of a servo valve housing. The housing 24 may typically be formed of aluminium. A nozzle 26 is arranged within a bore 28 of the nozzle housing 24. The nozzle 26 comprises a nozzle element 30 defining a central nozzle axis (X-X) and has a fluid outlet 32 at a first axial end 34, and a tubular body 36 extending from the first axial end 34 to an opposed, second axial end 38 of the nozzle element 30. The nozzle element 30 may typically be formed of a harder material than the housing 24, for example steel. In this embodiment the fluid outlet is arranged on the central axis X-X, but in other embodiments it may be offset from that axis.

A plug element 40 is mounted in and closes the second axial end 38 of the tubular body 36, thereby defining an internal cavity 42 within the nozzle element 30. The plug element 40 may typically be of aluminium. A plurality of openings 44 are formed through the tubular body 36 to fluidly communicate with the internal cavity 42. These form a fluid inlet to the nozzle element 30. In this embodiment there are six openings 44, but fewer or more openings may be provided within the scope of the disclosure. For example in another embodiment, four openings 44 may be provided. In a yet further embodiment, a single opening 44 may be provided. The total surface area of the openings 44 should, however, be large enough to accommodate the required flow through the nozzle 30 without losses.

In this embodiment, the plug element 40 and the second end 38 of the nozzle body 36 are provided with threads 46 to provide a threaded attachment therebetween Of course other mechanisms for mounting the plug element 4 to the nozzle body 36 may be used.

A rear face 48 of the plug element 40 (i.e. the face 48 of the plug element 40 on the opposite side of the plug element 40) from the internal cavity 42 of the nozzle element 30 includes a threaded bore 50. This threaded bore 50 receives a threaded end 52 of a push rod 54 (FIG. 6) which will, as will be described further below, be used in calibration of the nozzle 26 and possibly in insertion of the nozzle 26 into the nozzle housing bore 28. Although a threaded bore 50 is used to attach the push rod 54, other forms of attachment may be used within the scope of the disclosure.

The plug element 40 further includes an annular wall 56 extending in a direction away from the nozzle element 30 for sealing engagement with the bore 28 of the nozzle housing 24. The external surface of the annular wall 56b may have ribs 57 or threads formed therein to facilitate gripping engagement with the nozzle housing bore 28.

The annular wall 56 defines an internal cavity 58 open at one end. The cavity 58 tapers inwardly in the direction towards the nozzle element 30. The cavity 58 receives a pin 60, in this embodiment an annular pin 60. The pin 60 may, like the plug element 40, also be made from aluminium. The pin 60 also tapers inwardly in the direction towards the nozzle element 30 and acts, as will be described further below, to fix the plug element 40 and indeed the entire nozzle 26 in the housing bore 28.

The nozzle further comprises a filter element 62 mounted across the internal cavity 42 of the nozzle element 30 at a position axially intermediate the openings 44 and the fluid outlet 32, that is between the fluid inlet to the nozzle element 30 and the fluid outlet 32. The filter element 62 is, in some embodiments, removably mounted in the nozzle element to allow for its replacement during repair or maintenance.

In this embodiment, the filter element 62 is threadedly mounted in the nozzle element by a threaded coupling 64 between the filter element and nozzle element 30. Of course, other mountings may be envisaged, for example a push fit mounting. In this embodiment the filter element 62 is domed, although other shapes of element, such as planar elements, may be used within the scope of the disclosure.

It will be seen that the nozzle housing 24 has a first fluid port 70 which is in fluid communication with the openings 44 through the nozzle body 38. The nozzle housing 24 also has a second fluid port 71 in fluid communication with the fluid outlet 32 of the nozzle 30. The 28 of the nozzle housing 24 is formed with an annular groove 72 which is axially aligned with the first fluid port 70 of the nozzle housing 24 so that the first fluid port 70 opens into the annular groove 72. The openings 44 through the nozzle body are also axially aligned with the annular groove 72. There is therefore a fluid path created from the first fluid port 70 to the fluid outlet 32 of the nozzle element 30.

To avoid leakage of fluid around the nozzle body 38, the nozzle body 38 is sealingly fitted within the nozzle housing bore 28. There may, therefore be seals provided between the nozzle housing bore 28 and the nozzle body 32. Alternatively, and as illustrated in this embodiment, the fit between the two components may be such as to effect sealing. A small translational or interference fit may therefore be provided between the nozzle body 32 and the nozzle housing bore 28. For example, a H7/n6 or H7/k6 fit may be provided (nominal nozzle body diameter over 6 mm to 10 mm).

A small transition or interference fit can be provided in this case because the interference fit does not have to retain the nozzle element 30 in the nozzle housing bore. That is achieved through the plug element 40 and pin 60. Thus the nozzle element 30 and the nozzle housing bore can be made to less tight tolerances than in previous nozzles, thereby reducing manufacturing time and costs.

As discussed above, the pin 60 is received within the plug element 40. The pin 60 is forced into the plug element 40 and due to the tapering of both components will act to expand the annular wall 56 of the plug element into sealing and retaining contact with the nozzle housing bore 28. This type of expanding seal mechanism is known per se in the art, for example in a Lee Plug®.

Having described the overall construction of the nozzle assembly 22, its assembly and calibration will now be described.

Figure 4:
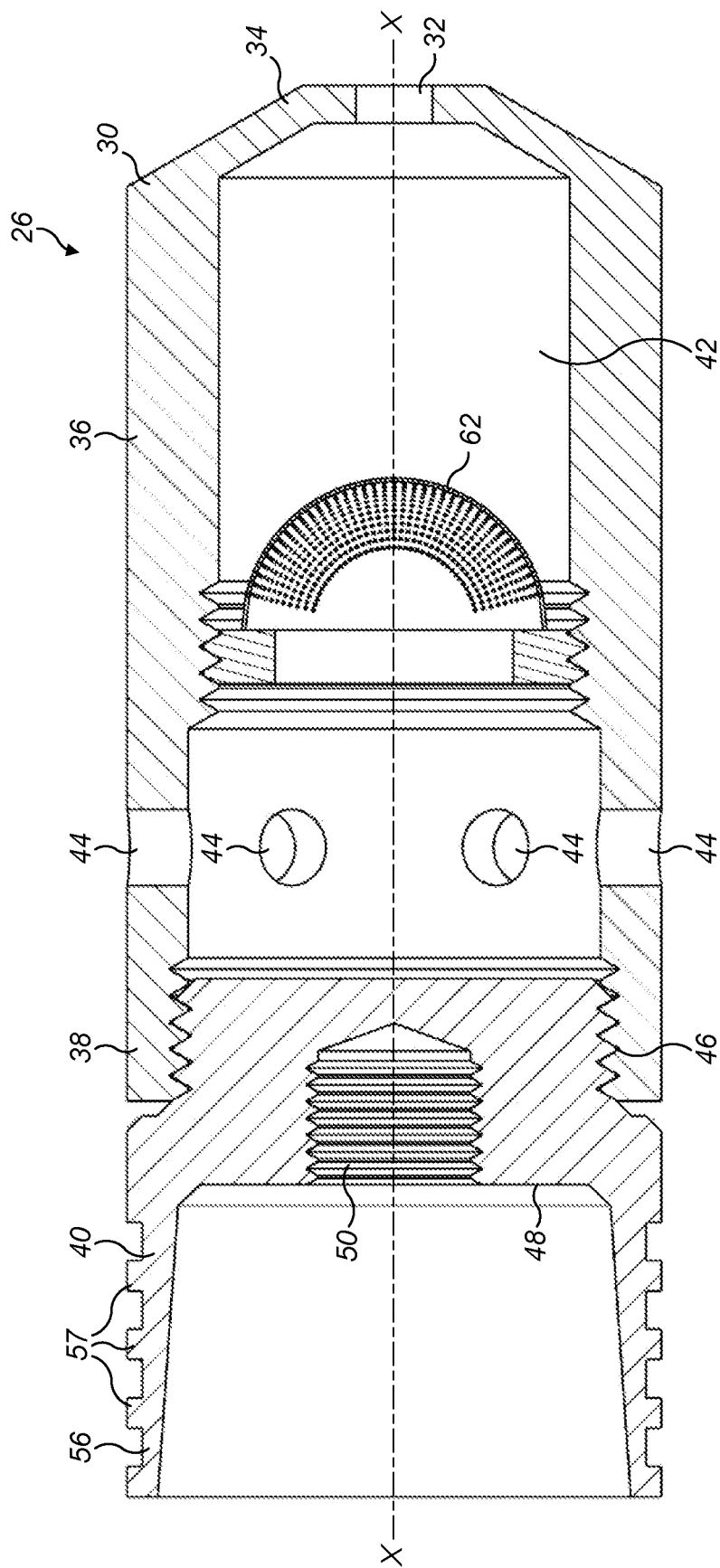
FIG. 4 shows a cross-sectional view of the nozzle of a nozzle assembly of FIG. 2.

As a first step, the nozzle 26 is first assembled. Thus, the filter element 62 is threadedly mounted in the nozzle body 3, and the plug element 40 then threadedly mounted in the second end 38 of the nozzle body 36. The nozzle 26 in this condition is shown in FIG. 4.

Figure 5:
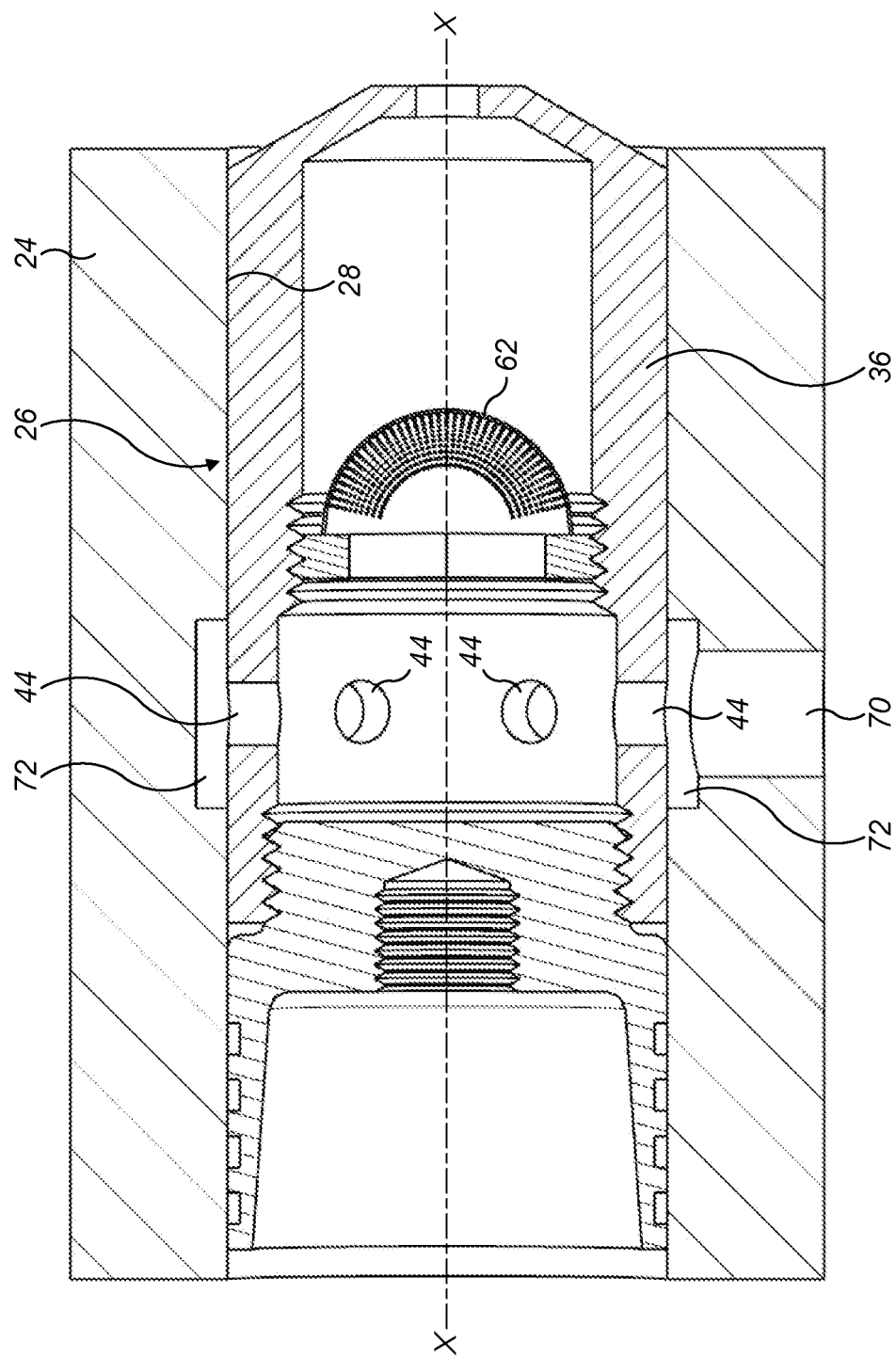
FIG. 5 shows a cross-sectional view the nozzle of FIG. 2 inserted in a nozzle housing during assembly and calibration.

The nozzle 26 is then inserted into the bore 28 of the nozzle housing 24, as illustrated in FIG. 5. In the inserted position, the openings 44 in the nozzle body 36 align with the annular groove 72 of the nozzle housing bore 28.

To assist in inserting the nozzle 26 into the nozzle housing bore 28, the user may attach the push rod 54 used for calibrating the nozzle 26 and shown in FIG. 6 and use the push rod to move the nozzle 26 within the nozzle housing bore 28.

To calibrate the nozzle 26, the push rod 54 if not already attached to the plug element 40 is attached to that element 40 and is moved along the axis X of the nozzle to move the nozzle 30 to the appropriate position. It will be seen that as the push rod 54 does not extend into the internal cavity 42 of the nozzle body 36, it does not interfere with the calibration process as it does not interact with the fluid flow through the nozzle 26. This allows for more accurate calibration, as no compensation need be applied to account for the subsequent removal of the push rod 54.

After the nozzle 30 has been moved to the appropriate axial position within the nozzle housing bore 28, the nozzle 30 is secured in position using the pin 60. While retaining the nozzle 30 in position by an appropriate force exerted through the push rod 54, the pin 60 is driven into the tapering cavity 58 of the plug element 40. This causes the annular wall 56 of the plug element 40 to expand radially and thereby seal and grip the nozzle housing bore 28.

In some embodiments, the pin 60 may be at least partially driven into the in the plug element 40 prior to calibration commencing so as to provide a better seal around the plug element 40 during calibration. In addition, the pin 60 may be at least loosely received within the tapering cavity 58 during the initial placement of the plug element 40 in the nozzle housing bore 28.

The push rod 54 may then be detached from the plug element 40, and a cover (not shown) be applied over the open end of the nozzle housing bore 28 if desired.

Both nozzles 30 shown in FIG. 6 may be installed and calibrated as described above.

The embodiments described above provide advantages over prior arrangements in terms of both ease of calibration and assembly. As explained, the push rod 54 does not interfere with the calibration process as it is no longer in a fluid flow path between the first fluid port 70 of the nozzle housing 24 and the fluid outlet 32 of the nozzle 30. There is therefore no need to compensate for the presence of the push rod 54 when calibrating. Also, as the filter element 62 is in position during calibration and remains there thereafter, there is no need to compensate for it during calibration.

In addition, as the nozzle 30 is retained in position in the nozzle housing bore 28 by the plug/pin assembly 40, 60, rather than by virtue of a tight interference fit therebetween, the tolerance between the nozzle body 38 and the nozzle housing bore 28 need not be so great as there is no need to ensure a tight interference fit in use. Rather, just a sealing fit may be provided between the nozzle body 30 and the nozzle housing bore 28. This reduces production times and costs.

It will be appreciated that modifications may be made to the particular embodiment disclosed above without departing from the scope of the disclosure. For example, in certain embodiments, the filter element 62 may be omitted and a filter be provided in the nozzle housing first fluid port 70.

Also, it should be noted that the filter 62 could be utilised in more traditional nozzle constructions such as those shown in FIG. 1, within the scope of the disclosure.

The invention claimed is:

1. A nozzle of or for a servo valve, the nozzle comprising:
   a nozzle element having a fluid outlet at a first axial end, and a tubular body extending from the first end to an opposed, second axial end of the nozzle element;
   a plug element mounted in and closing the second axial end of the tubular body, thereby defining an internal cavity within the tubular body; and
   one or more openings formed through the tubular body to fluidly communicate with the internal cavity;
   wherein the plug element comprises an annular wall extending in a direction away from the nozzle element and in sealing engagement with a bore of the servo valve.

2. A nozzle as claimed in claim 1, wherein the plug element is threadedly mounted within the second axial end of the nozzle element.

3. A nozzle as claimed in claim 1, wherein the plug element comprises an attachment for receiving a push rod.

4. A nozzle as claimed in claim 3, wherein the attachment comprises a bore formed in a surface of the plug element on the opposite side of the plug element from the internal cavity of the nozzle element.

5. A nozzle as claimed in claim 1, wherein the annular wall defines an internal cavity open at one end, the cavity tapering inwardly in a direction towards the nozzle element for receiving a pin.

6. A nozzle as claimed in claim 1, further comprising a filter element mounted across the internal cavity of the nozzle element at a position axially intermediate the one or more openings and the fluid outlet.

7. A nozzle as claimed in claim 6, wherein the filter element is removably mounted in the nozzle element.

8. A nozzle assembly for a servo valve, the nozzle assembly comprising:
   a nozzle housing having a bore; and
   a nozzle as claimed in claim 1 mounted in the bore of the nozzle housing;
   wherein the nozzle housing comprises a first fluid port in fluid communication with the one or more openings in the nozzle element and a second fluid port in fluid communication with the fluid outlet of the nozzle element.

9. A nozzle assembly as claimed in claim 8, wherein the bore of the nozzle housing comprises an annular groove formed therein, the first fluid port of the nozzle housing opening into the groove and the one or more openings of the nozzle element being axially aligned with the annular groove.

10. A nozzle assembly as claimed in claim 8, wherein the tubular body of the nozzle element is a sealing fit within the bore of the nozzle housing.

11. A nozzle assembly as claimed in claim 8, wherein the plug element (40) is secured and sealed against the bore of the nozzle housing.

12. A nozzle assembly as claimed in claim 11, further comprising:
   a pin received within the tapering cavity defined by the annular wall of the plug element for forcing the annular wall of the plug element into sealing and gripping engagement with the bore of the nozzle housing.

13. A method of calibrating a nozzle assembly as claimed in claim 9, the method comprising:
   inserting a nozzle into the bore of the nozzle housing, the nozzle comprising:
      a nozzle element having a fluid outlet at a first axial end, and a tubular body extending from the first end to an opposed, second axial end of the nozzle element;
      a plug element mounted in and closing the second axial end of the tubular body, thereby defining an internal cavity within the tubular body; and
      one or more openings formed through the tubular body to fluidly communicate with the internal cavity;
   attaching a calibration tool to the plug element and moving the nozzle in a direction along its axis (X) to a desired position by application of an axial force to the calibration tool;
   securing the nozzle in the bore of the nozzle housing; and
   detaching the calibration tool from the plug element.

14. A method as claimed in claim 13, wherein securing the nozzle is effected before the calibration tool is detached from the plug element, the calibration tool preventing axial movement of the nozzle during the securing.

15. A nozzle as claimed in claim 4, wherein the attachment comprises a threaded bore.

16. A nozzle as claimed in claim 7, wherein the filter element is threadedly mounted in the nozzle element.

17. A method as claimed in claim 13, wherein the calibration tool is a push rod.

\* \* \* \* \*